United States Patent
Meyer et al.

(10) Patent No.: US 10,527,483 B2
(45) Date of Patent: Jan. 7, 2020

(54) AUTOMATED DOSAGE-DISPENSING SYSTEM FOR POWDERY SUBSTANCES, AND METHOD OF ASCERTAINING THAT THE SYSTEM IS READY FOR OPERATION

(71) Applicant: Mettler-Toledo GmbH, Greifensee (CH)

(72) Inventors: Michalis Meyer, Nänikon (CH); Daniel Keller, Schaffhausen (CH); Jan Hofmann, Greifensee (CH); René Weber, Esslingen (CH)

(73) Assignee: METTLER-TOLEDO GMBH, Greifensee (CH)

( * ) Notice: Subject to any disclaimer, the term of this patent is extended or adjusted under 35 U.S.C. 154(b) by 231 days.

(21) Appl. No.: 15/813,369

(22) Filed: Nov. 15, 2017

(65) Prior Publication Data

US 2018/0149512 A1    May 31, 2018

(30) Foreign Application Priority Data

Nov. 29, 2016  (EP) ..................................... 16201054

(51) Int. Cl.
| | |
|---|---|
| *B05B 1/06* | (2006.01) |
| *B65G 53/20* | (2006.01) |
| *B67D 7/08* | (2010.01) |
| *G01F 13/00* | (2006.01) |
| *G01F 15/18* | (2006.01) |

(Continued)

(52) U.S. Cl.
CPC .............. *G01G 17/06* (2013.01); *B05B 1/06* (2013.01); *B65G 53/20* (2013.01); *B67D 7/08* (2013.01); *G01F 13/001* (2013.01); *G01F 15/18* (2013.01); *G01G 13/24* (2013.01)

(58) Field of Classification Search
CPC ...... G01G 17/06; G01G 13/24; G01F 13/001; G01F 15/18; B05B 1/06; B65G 53/20; B67D 7/08

See application file for complete search history.

(56) References Cited

U.S. PATENT DOCUMENTS

| 5,137,693 A | * | 8/1992 | Mawhirt | ................... | B01L 9/06 |
| | | | | | 206/446 |
| 5,985,219 A | * | 11/1999 | Lind | ......................... | B01L 9/06 |
| | | | | | 422/562 |

(Continued)

*Primary Examiner* — Benjamin R Whatley
*Assistant Examiner* — Curtis A Thompson
(74) *Attorney, Agent, or Firm* — Standley Law Group LLP; Jeffrey S. Standley; Stephen L. Grant (57) ABSTRACT

A system (1) dispenses dosages of a powdery substance. It has a robotic handler (2), a weighing module (8) with a weighing pan (9), at least one storage rack (4) for holding a plurality of dispensing heads (3) and at least one storage rack (6) for holding a plurality of vials (5), a dosage dispenser unit (11) with a dispensing head receiver (12), a vial handling tool (17) and a dispensing head handling tool (18), a tool-docking station (19) for the handling tools, and a controller terminal unit (20). Different weighing pan adapters (15) adapt the weighing pan to different shapes and sizes of vials. Relative to a vertical working orientation, tlower portions of the weighing pan adapters are identical, to fit the weighing pan, but upper portions are different, to accommodate different shapes and sizes of vials. A station (16) is provided for storing the weighing pan adapters.

13 Claims, 5 Drawing Sheets

(51) Int. Cl.
 *G01G 13/24* (2006.01)
 *G01G 17/06* (2006.01)

(56) References Cited

U.S. PATENT DOCUMENTS

| | | | | |
|---|---|---|---|---|
| 6,539,334 | B1* | 3/2003 | Sawafta | G01G 17/06 141/165 |
| 7,996,107 | B2 | 8/2011 | Gueller et al. | |
| 8,191,587 | B2* | 6/2012 | Luechinger | G01F 13/001 141/268 |
| 8,313,711 | B2 | 11/2012 | Brown et al. | |
| 8,448,817 | B2 | 5/2013 | Bloechlinger et al. | |
| 9,574,932 | B2 | 2/2017 | Weber | |
| 2006/0259195 | A1* | 11/2006 | Eliuk | A61J 1/20 700/245 |
| 2007/0255455 | A1* | 11/2007 | Busacca | G01G 17/04 700/249 |
| 2009/0078334 | A1* | 3/2009 | Nufer | B65B 1/36 141/83 |
| 2010/0313688 | A1* | 12/2010 | Hiltbrand | G01N 35/1002 73/864.91 |
| 2011/0204088 | A1* | 8/2011 | Luchinger | G01F 11/00 141/83 |
| 2011/0286886 | A1* | 11/2011 | Luchinger | G01G 19/00 422/68.1 |

* cited by examiner

AUTOMATED DOSAGE-DISPENSING SYSTEM FOR POWDERY SUBSTANCES, AND METHOD OF ASCERTAINING THAT THE SYSTEM IS READY FOR OPERATION

CROSS-REFERENCE TO RELATED APPLICATIONS

This application claims priority to EP 16 201 054.0, filed 29 Nov. 2016, the content of which is incorporated by reference as if fully recited herein.

TECHNICAL FIELD

The present invention concerns an automated dosage-dispensing system for dispensing large numbers of measured doses of materials in powder form from source containers into receiving containers, and it further concerns a method of ascertaining that the dosage-dispensing system is ready for operation. The kind of apparatus that the invention relates to is used for example in screening laboratories and formulation laboratories in the pharmaceutical industry where small, precisely measured doses of powder are dispensed into vials in very large numbers.

SUMMARY

A dosage-dispensing device as described and illustrated for example in EP 1 959 244 A1 (U.S. Pat. No. 8,191,587 B2) includes in its basic configuration an analytical balance, an actuator base unit, a dispensing head with a delivery orifice whose aperture can be controlled by a shutter element, and a computer or controller unit. The dispensing head which includes the source container with the powder to be dispensed is set in place on the actuator base unit whereby an operative coupling between the actuator base unit and the dispensing head is simultaneously engaged. The actuator base unit, by way of the coupling, actuates the shutter element and drives stirring and propelling elements which serve to loosen the powder in the dispensing head and to propel it towards the delivery orifice. In the operating state of the apparatus, the actuator base unit with the dispensing head is mounted on a support structure and the analytical balance is arranged with its weighing pan below the delivery orifice, so that powder can be dispensed from the delivery orifice into a receiving container that is placed on the weighing pan.

During the dosage-dispensing process, the substance being dispensed flows out of the dispensing head into the receiving container whose weight is continuously measured by the balance and communicated to the computer or controller unit which, in turn, sends command signals to the actuator base unit to regulate the shutter aperture of the delivery orifice and the action of the stirring and loosening elements and thereby to control the powder flow and to stop the dispensing process as soon as the predetermined target quantity of substance has been dispensed into the receiving container.

Dosage-dispensing devices of this kind are also often used to prepare mixtures of several individual substances. For this purpose, a changing mechanism is proposed in the aforementioned EP 1 959 244 A1, wherein the basic dosage-dispensing device can be additionally equipped with a linear or carousel-shaped changing mechanism holding a plurality of dispensing heads with different substances and wherein the different dispensing heads can be automatically moved into the dispensing position above the receiving container.

A dosage-dispensing device whose basic configuration is analogous to the preceding example, with an analytical balance, a dispensing head, a actuator base unit, and a computer or controller unit, is also shown in EP 1 947 427 A1 (U.S. Pat. No. 8,448,817 B2). To facilitate the switching between different powder substances, a free-standing multi-unit storage rack holding a plurality of dispensing heads is arranged next to the dosage-dispensing device. The dispensing heads can be transferred between the storage rack and the seating location on the dosage-dispensing device by means of a loading mechanism, for example an industrial robot.

An automated dosage-dispensing system described in U.S. Pat. No. 7,996,107 B2 is based on a Cartesian robot with a tool holder that can be displaced linearly along mutually orthogonal x-, y- and z-axes as well as rotated about the vertical z-axis. The tool holder can hold one or more dispensing devices for powders or liquids which can be brought into predetermined dispensing positions above receiving vessels that are arranged in a stationary holder rack. The tool holder with the one or more dispensing devices can be supported on the robot by way of a weighing device which measures the combined weight of the tool holder with the one or more dispensing devices as well as the substance contained in them. Thus, from the weight loss measured by the balance during a dispensing process, the amount of powder or liquid delivered out of a dispensing device can be determined. For the typical kinds of laboratory applications mentioned hereinabove in the introductory paragraph, this so-called loss-in-weight concept of weighing the dispensing device in order to determine the amount of dispensed substance appears problematic, because the small amount of dispensed substance would have to be weighed with high precision ($10^{-6}$ grams) on top of the comparatively large base load (several hundred grams) of the tool holder and dispensing device. This would require a balance with unrealistic specifications, i.e. 6-decimal precision combined with a large load capacity that is generally found only in balances with a precision of no more than four decimals.

In a further automated dosage-dispensing system which is described in U.S. Pat. No. 8,313,711 B2, a rack holding a plurality of receiving vessels is placed on a stationary balance. A Cartesian robot brings a dispensing device into position over specific receiving vessels in the rack to dispense predetermined amounts of a powderous or liquid substance from the dispensing device to the receiving vessel. In this case, the dispensed quantity is determined from the gain in weight of the receiving vessel. Similar to the preceding example, the small amount of substance dispensed is weighed on top of a comparatively large base load of the rack and all of the other receiving vessels in it. This concept would again require a balance with a load capacity that is not realistically compatible with 6-decimal precision.

Given that a high weighing accuracy of the order of $10^{-6}$ grams as required by the aforementioned pharmaceutical applications is most feasible with a weighing device in the typical range of microbalances which have a capacity of 20 to 50 grams readable to six decimals, the applicant's development efforts have been aimed at automating a dosage-dispensing system in which substance is dispensed from a dispensing head into a small, light-weight receiving vessel, in particular a vial, that is seated on the balance pan of a high-accuracy balance or weighing module, wherein the functions of the dispensing head are regulated in a feedback control loop in response to weight signals received from the weighing module, analogous to the aforementioned examples of EP 1 959 244 A1 and EP 1 947 427 A1. To automate the functions of handling the vials and dispensing heads, a Cartesian coordinate robot system was used, similar to a system described in US 2015/0276471 A1, where a Cartesian coordinate robot system is employed to perform an automated serial weighing process in the testing of filters which are used in air pollution measurements. In the development of the automated dosage-dispensing system of the present invention, the applicant encountered the problem that the practical usefulness of an automated dosage dispensing system depends to a large degree on its capability to accommodate different types of vials. In particular, it has to be possible to automatically set vials of different shapes and sizes into a vial seating position on the weighing pan in order to dispense a measured dose of substance out of the dispensing head into the vial.

It is therefore the object of the present invention to provide an automated dosage dispensing system which can automatically adapt to different shapes and sizes of vials that can be placed in the vial seating position on the weighing pan. A further object of the invention is to provide a method of ascertaining, prior to starting a job lot of vials of a given type, that the automated dosage dispensing system has been correctly adapted to the vial type.

SUMMARY

This task is solved with an automated dosage-dispensing system that includes the features set forth in the appended patent claims and with a method that includes the features and steps set forth in the claims.

A dosage-dispensing system for powdery substances includes a robotic handler, a weighing module with a weighing pan, at least one dispensing head storage rack holding a plurality of dispensing heads and at least one vial storage rack holding a plurality of vials, a dosage dispenser unit with a dispensing head receiver, a vial handling tool and a dispensing head handling tool, a tool-docking station for said handling tools, and a controller terminal unit. The dosage dispenser unit serves to hold and support one of the dispensing heads by means of the dispensing head receiver. The dosage dispenser unit is movable horizontally between a dispensing position and a rest position. In the dispensing position, the delivery orifice of the dispensing head on the dispensing head receiver is located above a vial on the weighing pan. In the rest position, the dispensing head on the dispensing head receiver is moved away from said location above the weighing pan. The controller terminal unit serves to control the movements of the dosage dispenser unit between the dispensing position and the rest position, to control the robotic handler in picking up and transporting the dispensing heads and the vials, and further to control and regulate the flow of substance from the dispensing head that is seated on the dispensing head receiver. The controller terminal unit cooperates with the weighing module, the dosage dispenser unit and the dispensing head in a closed loop, regulating the flow of substance out of the dispensing head in response to weight signals received from the weighing module. Specifically in accordance with the invention, the dosage-dispensing system includes a plurality of different weighing pan adapters serving to adapt the weighing pan to different shapes and sizes of vials, wherein the weighing pan adapters, relative to their vertical working orientation, have lower portions that are identical and are configured to fit the weighing pan, and upper portions that are different and are configured to accommodate different shapes and sizes of vials. Further according to the invention, the dosage-dispensing system includes a weighing pan adapter storage station, and the weighing pan adapters are configured so that they can be picked up and transported between the weighing pan adapter storage station and the weighing pan by the robotic handler with the vial-handling tool.

Although the task of transporting and switching the weighing pan adapters between the weighing pan adapter storage station and the weighing pan could be performed manually, this critical step in the operation of the dosage-dispensing system was found to be error-prone. A mistake could lead to a collision between the robotic handler and the weighing pan adapter and/or the vial on the weighing pan, which could break the vial, cause spillage of the dispensed substance, or even cause serious mechanical damage to the weighing module. The inventive concept whereby the weighing pan adapters are transported and set into place by the robotic handler avoids the risk of operator errors.

In a preferred embodiment of the invention, the weighing pan has the shape of a bottomless cylindrical cup wherein, relative to the working orientation of the system, a cylinder axis of the cup is oriented vertical and wherein the inside wall contour of the cup has, from the bottom upward, a first cylindrical internal wall section with a first diameter, a second cylindrical internal wall section with a second diameter larger than said first diameter, and a conically chamfered internal border section with an upward widening diameter ending in a flat horizontal rim at the top.

Advantageously, the identical lower portions of the weighing pan adapters are configured in the basic shape of hollow cylindrical tubes that are shaped and dimensioned for setting the weighing pan adapter into the cup-shaped weighing pan with the cylinder axis of the hollow tube orientated vertically.

In a preferred embodiment of the invention, advantageous contour details are added to the basic tubular shape to facilitate the secure and accurately centered seating of the weighing pan adapter in the weighing pan. These contour details include that the identical lower portion of the weighing pan adapters preferably has a convex-rounded bottom part whose contour curve is designed to position the weighing pan adapter with a desired degree of accuracy within the first cylindrical internal wall section of the weighing pan;

further that from said convex-rounded bottom part, the outside contour of the identical lower portion continues upward into a first cylindrical part with a first cylinder diameter dimensioned to ensure clearance between said first cylindrical part and the second cylindrical internal wall section of the weighing pan;

further that from said first cylindrical part, the outside contour of the identical lower portion continues upward through a tapered increase in diameter to a second cylindrical part with a second cylinder diameter dimensioned to ensure a centered alignment of said second cylindrical part in the second cylindrical internal wall section of the weighing pan;

and that upward of said second cylindrical part, the outside contour of the identical lower portion ends in a shoulder designed to seat itself on the flat horizontal rim of the weighing pan when the weighing pan adapter is lowered and set into the weighing pan.

In preferred embodiments of the invention, the upper portions of the weighing pan adapters are likewise of a substantially cylindrical tubular configuration, but with different cylinder diameters, particularly of the inside walls, corresponding to the different sizes of the vials. Advantageously, the substantially cylindrical tubular-shaped weighing pan adapters have conically chamfered inside edges at the top.

As a preferred feature, the weighing pan adapters include inside their upper portions a star-shaped arrangement of three or more pins protruding radially inwards in a plane extending orthogonally to the cylinder axis of the weighing pan adapter. The purpose of these pins is to delimit a seating depth such that the top of an inserted vial sitting on the pins protrudes sufficiently from the weighing pan adapter to allow the vial to be gripped by the vial handling tool. An arrangement of three pins is preferred, because it provides a stable seating for the vial and also minimizes the horizontal surface area that could catch any powder accidentally falling outside the vial.

In weighing pan adapters that are designed for vials of different height, the pins are preferably placed at such a distance from the bottom end of the weighing pan adapter that the tops of different vials seated in their respective different weighing pan adapters are always at the same top height from the bottom of the weighing pan adapter.

Advantageously, the upper portions of the weighing pan adapters have outside wall contours configured with a gripping area to allow the weighing pan to be gripped by the vial handling tool. Preferably, the gripping area is cylindrical and has a slightly smaller diameter than the rest of the outside wall of the upper portion, with bevelled transitions from the gripping area to the adjacent wall portions above and below the gripping area. This contour shape of the gripping area ensures that the weighing pan adapter cannot slip out of the grip of the vial-handling tool during transport.

In preferred embodiments of the invention, all of the weighing pan adapters of the dosage-dispensing system have a nominally equal weighing pan adapter weight. This allows the weight of the weighing adapter on the weighing pan to be mechanically counterbalanced with a fixed counter-balancing mass in the weighing module. Thus, the electronic weighing range of the weighing module needs to be only large enough to cover the largest possible weight for a vial including its content.

Advantageously, among a plural number n of weighing pan adapters, the individual different weighing pan adapters are assigned identifying numbers i=1 . . . n. The robotic handler fitted with the vial-handling tool is designed with the capability to grip a vial at a predetermined vial-gripping height $h_v$ and with a vial-gripping width $w_v$, and also to grip each weighing pan adapter i at a predetermined adapter-gripping height $h_i$ and with an adapter-gripping width $w_i$. Each weighing pan adapter i is distinguished from the other weighing pan adapters by at least one of the adapter-gripping height $h_i$ and the adapter-gripping width $w_i$.

The following method, which can be implemented as a software program in the controller terminal, serves to ascertain prior to starting a new job lot of vials of a given vial type that the dosage-dispensing system is ready for operation, i.e. that the correct weighing pan adapter is in place on the weighing pan. For the purpose of describing the method, it is assumed that the consecutive numbers i=1 . . . n are assigned to the weighing pan adapters in order of decreasing gripping height $h_i$ and/or decreasing gripping width $w_i$ and that i* identifies the correct weighing pan adapter for the given vial type. According to the method, the dosage-dispensing system under the command of the controller terminal executes a test routine with a sequence of binary yes/no decisions as follows:

a) check whether any vial is present on the balance and, if yes, remove said vial;

b) in sequential order of i, determine if the weighing pan adapter that is present on the weighing pan is the adapter with the number i and, if yes, continue at step c), else increase the number i by 1 and continue at step e)

c) check whether i=i* and, if yes, end the test routine, else continue at step d);

d) remove the weighing pan adapter that is currently on the weighing pan and store it in the weighing pan adapter storage station, pick weighing pan adapter i* from the weighing pan adapter storage station and set it on the weighing pan, end the test routine;

e) check whether i<n and, if yes, continue at step b); else continue at step c).

In the foregoing test routine, the step of checking for the presence of a vial on the weighing pan can be performed advantageously with the help of the weighing module and the robotic handler fitted with the vial-handling tool, and with the dosage dispenser unit in the rest position, as follows:

a1) bring the vial-handling tool into position above the weighing pan;

a2) set the balance to zero, a3) lower the vial-handling tool to the vial-gripping height $h_v$, a4) close the vial-handling tools to the vial-gripping width $w_v$, a5) raise the vial-handling tool, a6) receive a weighing result from the weighing module and, if said weighing result indicates that a weight was lifted from the weighing pan, conclude that a vial was present and that the binary decision result is yes, in which case the vial is moved to a predetermined vial-dump location in the dosage-dispensing system.

After step a) has been completed, the cyclically repeated step b) of determining whether the weighing pan adapter that is present on the weighing pan is the adapter with the number i can be performed analogously to step a) with the help of the weighing module and the robotic handler fitted with the vial-handling tool, and with the dosage dispenser unit in the rest position, as follows:

b1) move the handler so that the vial-handling tool is positioned above the weighing pan, b2) set the balance to zero, b3) lower the vial-handling tool to the gripping height $h_i$, b4) close the vial-handling tools to the gripping width $w_i$, b5) raise the vial-handling tool, b6) receive a weighing result from the weighing module and, if said weighing result plausibly correlates to the lifting of a weighing pan adapter from the weighing pan, conclude that the weighing pan adapter that is present on the weighing pan is the adapter with the number i and that the binary decision result is yes.

BRIEF DESCRIPTION OF THE DRAWINGS

The automated dosage-dispensing system according to the invention will be described hereinafter through embodiments shown schematically in the drawings, wherein.

DETAILED DESCRIPTION OF THE DRAWINGS

Figure 1:
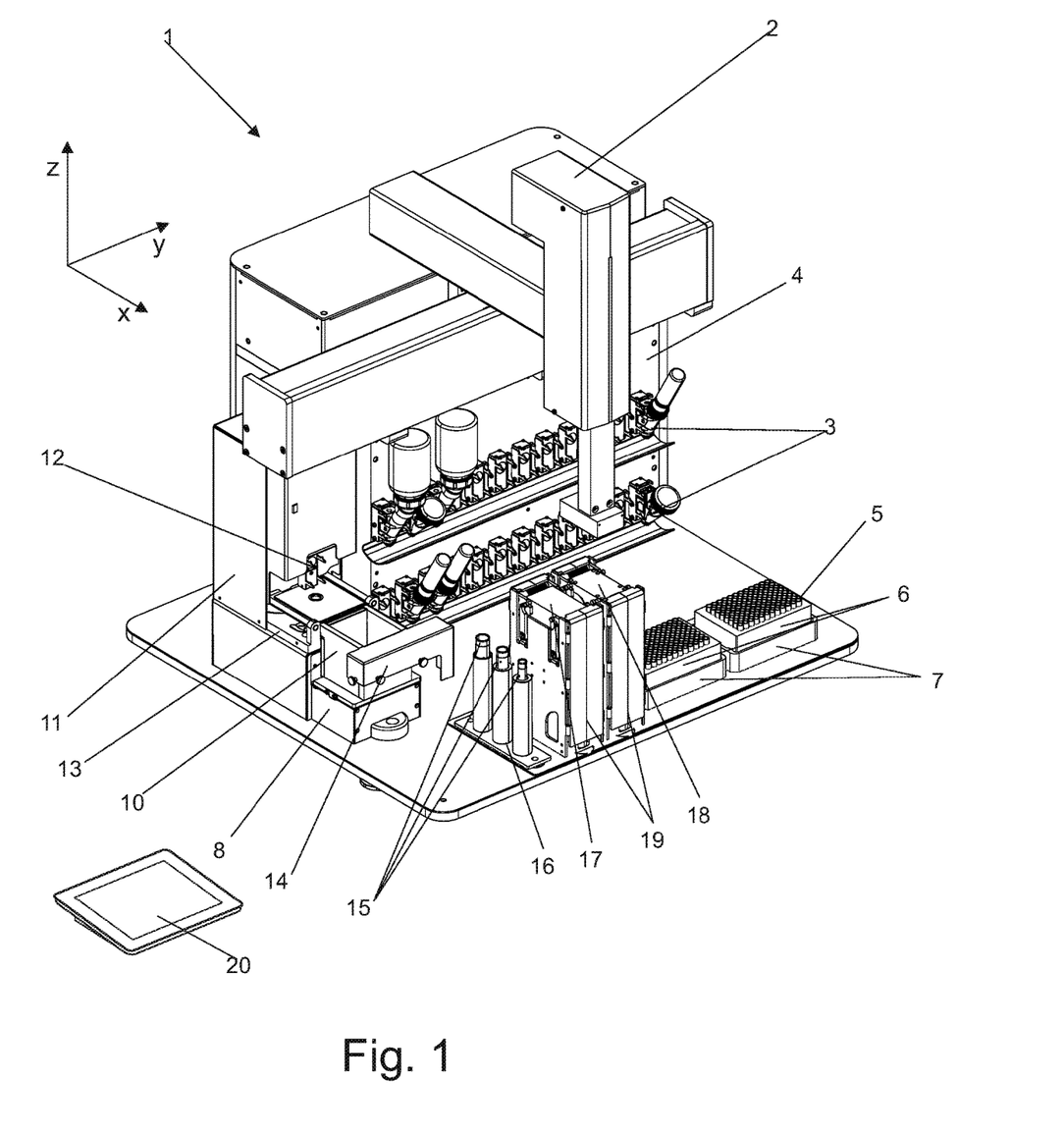
FIG. 1 represents a perspective overview of an automated dosage-dispensing system according to the invention.

To provide an overall orientation, FIG. 1 shows a perspective overview of an automated dosage-dispensing system 1 according to the invention with a robotic handler 2 movable in mutually orthogonal directions X, Y, Z. Dosage-dispensing heads 3 are stored in a dispensing head rack 4. Receiving vessels in the form of vials 5 are stored in vial racks 6 which are seated in vial rack cradles 7. In the view of FIG. 1, the weighing module 8 is arranged to the left of the dispensing head rack 4. The weighing pan 9 is not visible in FIG. 1 inside the draft shield-enclosed weighing chamber 10, but can be seen clearly in FIG. 2. The dosage-dispenser unit 11 with the dispensing head receiver 12 is slidably supported on an understructure 13 which straddles a rear portion of the weighing module 8 (see FIG. 2). An air ionizer 14 which serves to neutralize electrostatic charges is arranged in front of the weighing chamber 10. Weighing pan adapters 15 are stored in the weighing pan adapter storage station 16. The vial-handling tool 17 and the dispensing head handling tool 18 are parked in the handling tool docking station 19. The controller terminal 20 is operatively connected to the robotic handler 2, to the weighing module 8, and to the dosage dispenser unit 11 to control their respective operating functions.

The essential operating functions of the robotic handler 2 include:

connecting itself to the vial-handling tool 17 or the dispensing head handling tool 18 as needed to subsequently handle a vial 5, a weighing pan adapter 15, or a dosage-dispensing head 3;

picking up and transporting a weighing pan adapter 15 between the weighing pan adapter storage station 16 and the weighing pan 9;

picking up and transporting a vial 5 between a vial rack 6 and a weighing pan adapter 15 that is currently seated on the weighing pan 9; and picking up and transporting a dosage-dispensing head 3 between the dispensing head rack 4 and the dispensing head receiver 12 of the dosage dispenser unit 11.

The primary operating function of the weighing module 8 is to continuously weigh the vial 5 on the weighing pan 9 while powder is being dispensed into the vial 5 during a dispensing process, and to send a corresponding continuously updated weight signal to the controller terminal 20.

The essential operating functions of the dosage dispenser unit 11 include:

moving back and forth in the X-direction between a rest position as required to exchange dispensing heads 3, vials 5 and weighing pan adapters 15, and an operating position as required to dispense dosage material from the dispensing head 3 currently seated in the dispensing head receiver 12 into the vial 5 seated in the weighing pan adapter 15 that is currently in place on the weighing pan 9;

actuating an aperture-control device of a delivery orifice (not shown in the drawings) of the dispensing head 3 currently seated in the dispensing head receiver to regulate the flow rate and shut off the flow of powder from the dispensing head 3 into the vial 5 as directed by the controller terminal 20 in response to weight signals received from the weighing module 8; and actuating any stirrer, shaker or other agitator elements of the dosage dispenser unit 11 and/or of the dispensing head 3 that serve to loosen the dosage material and promote the flow of dosage material through the delivery orifice.

Figure 2:
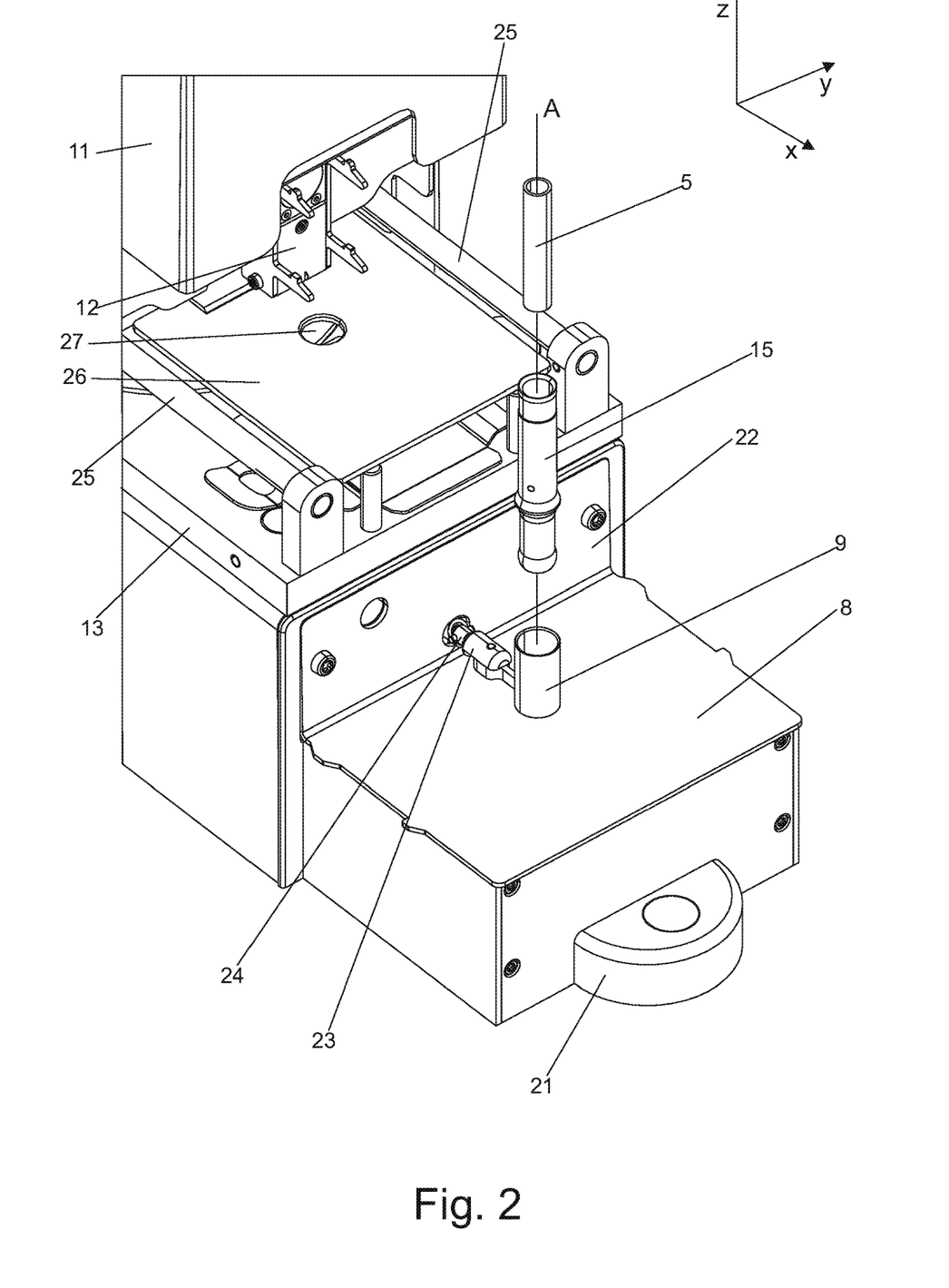
FIG. 2 shows portions of the weighing module and the dosage-dispenser unit and illustrates how the vial, the weighing pan adapter and the weighing pan fit inside each other.

FIG. 2 shows details of the weighing module 8 and the dosage dispenser unit 11 and illustrates how the vial 5, the weighing pan adapter 15 and the weighing pan 9 fit inside each other. A spirit level 21 is mounted at the front of the weighing module 8. A rear portion 22 of the weighing module 8 contains the weighing cell (not shown). Connected to the weighing cell is the load receiver arm 23 which reaches by way of a pass-through opening 24 into the weighing chamber 10 (shown here with the draft shield removed) and carries the weighing pan 9. The dosage dispenser unit 11 is supported by the understructure 13 which is arranged on top of the rear portion 22 of the weighing module 8. The dosage dispenser unit 11 is slidably supported on the understructure 13 by means of slide rails 25 aligned in the X-direction which allow the dosage dispenser unit 11 (under the control of the controller terminal 20) to move backward into the rest position (shown here) and forward into the operating position. The dispensing head receiver 12 in the form of a four-pronged holder bracket is shown here without a dosage-dispensing head 3 in place. In the rest position, the sheet metal cover 26 is retracted from the weighing chamber 10, so that the air space above the weighing pan 9 is accessible for the robotic handler 2 with the vial-handling tool 17 to exchange vials 5 and weighing pan adapters 15. In the operating position, the sheet metal cover 26 is positioned over the weighing chamber 10 with the flow stream passage opening 27 centered above the vial 5.

Figure 3:
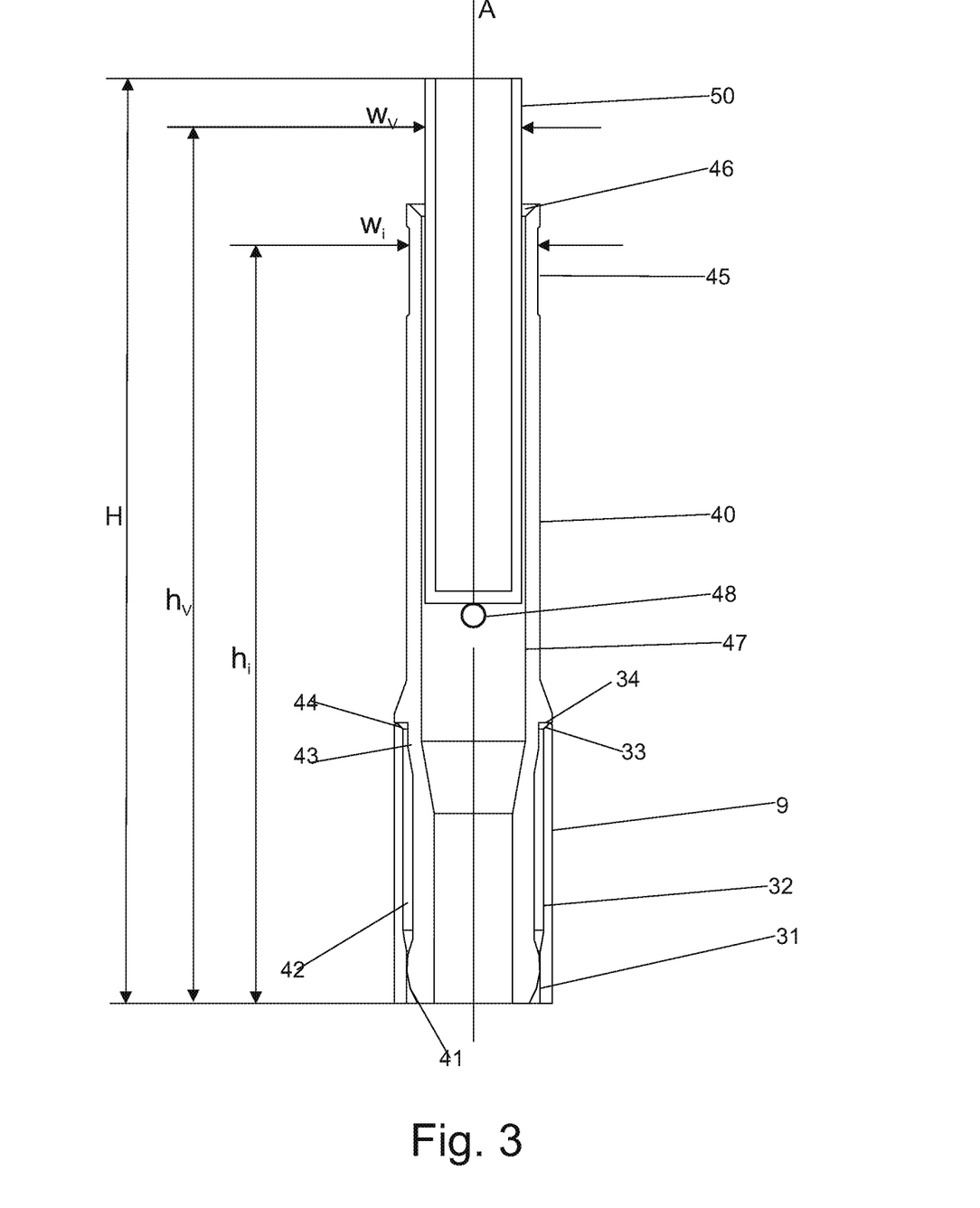
FIG. 3 illustrates the details of a weighing pan adapter according to the invention.

FIG. 3 illustrates an example of a weighing pan adapter 40 seated inside the weighing pan, with a vial 50 seated in the weighing pan adapter 40. The vial 50, the weighing pan adapter 40 as well as the cup-shaped weighing pan 9 are of a rotationally symmetric configuration. Seated inside each other in their operating position, their respective axes of rotational symmetry coincide in the common vertical axis A.

The weighing pan 9 has the shape of a bottomless, substantially cylindrical cup or hollow tube. The inside wall of the weighing pan 9 has, from the bottom upward, a first cylindrical internal wall section 31 with a first diameter, a second cylindrical internal wall section 32 with a second diameter larger than said first diameter, and a conically chamfered internal border section 33 with an upward widening diameter ending in a flat horizontal rim 34 at the top.

The lower portion of the weighing pan adapter 40 is configured in the basic shape of a hollow cylindrical tube with an outside contour designed for setting the weighing pan adapter 40 into the cup-shaped weighing pan 9. From the bottom upward, the outside contour of the weighing pan adapter has a convex-rounded bottom part 41 whose meridian curve is designed to position the weighing pan adapter 40 with a desired degree of accuracy within the first cylindrical internal wall section 31 of the weighing pan 9;

a first cylindrical part 42 with a first cylinder diameter dimensioned to ensure clearance between the first cylindrical part 42 and the second cylindrical internal wall section 32 of the weighing pan;

a second cylindrical part 43 with a second cylinder diameter dimensioned to keep the clearance gap between the second cylindrical part 43 and the second cylindrical internal wall section 32 of the weighing pan 9 sufficiently narrow that the weighing pan adapter 40 will return on its own from an accidentally tilted position to the upright position; and a shoulder 44 designed to seat itself on the flat horizontal rim 34 of the weighing pan 9 when the weighing pan adapter 40 is lowered and set into the weighing pan 9.

The upper portions of the weighing pan adapters 40, extending upward from the shoulder 44, are of hollow cylindrical configuration with a conically chamfered inside edge 46 at the top. The diameters of the inside cylinder walls 47 of the upper portions correspond to the different sizes of the vials 50 and, consequently, the upper portions may also differ among each other in regard to their outside diameters. Three pins 48 protrude radially from the inside wall 47 towards the cylinder axis A in a star-shaped arrangement at angles of 120° from each other. The pins 48 serve to delimit a seating depth such that the top of an inserted vial 50 protrudes sufficiently from the weighing pan adapter 40 to allow the vial 50 to be gripped by the vial handling tool 17. Furthermore, in different weighing pan adapters 40 for vials 50 of different height, the respective seating depths are set so that a vial top height H from the bottom of the weighing pan 9 to the top of any inserted vial 50 is the same for all of the weighing pan adapters 40 of the dosage-dispensing system.

Upward of the shoulder 44, the weighing pan adapters 40 have outside wall contours configured to allow the weighing pan adapter 40 to be gripped by the vial handling tool 17. The outside wall contour of the upper portion includes an outside wall contour section 45 configured as a gripping area with a slightly smaller cylinder diameter than the rest of the outside wall of the upper portion, with beveled transitions from the gripping area to the adjacent wall portions above and below the gripping area. This contour shape of the upper portion ensures that the weighing pan adapter cannot slip out of the grip of the vial-handling tool during transport.

Figure 4:
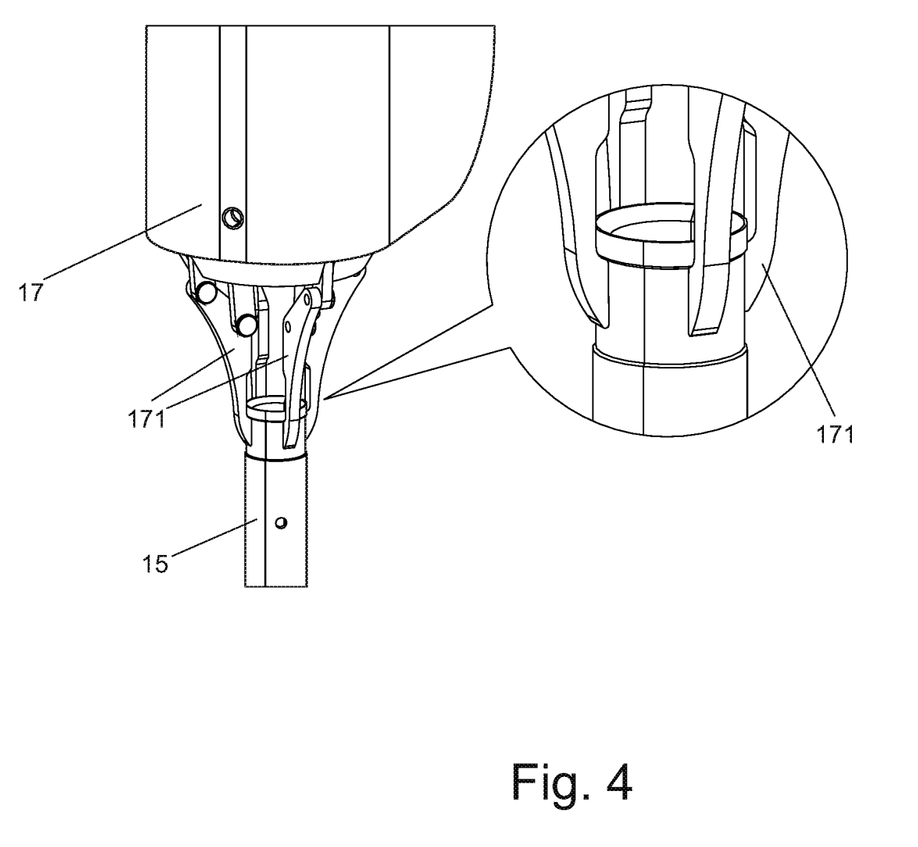
FIG. 4 shows details of an example of a vial-handling tool.

FIG. 4 represents a detail view of an example of a vial-handling tool 17 with four gripping fingers 171. To lift a vial 5 out of its seat in a vial rack 6 or in a weighing pan adapter 15, or to lift a weighing pan adapter 15 out of its seat in the weighing pan adapter storage station 16 or out of the weighing pan 9, the robotic handler is moved into a position where the vial handling tool is vertically above the vial 7 or weighing pan adapter 15, with the gripping fingers 171 spread wide open. Next, the robotic handler with the vial-handling tool 17 is lowered to the appropriate gripping height for the vial 7 or weighing pan adapter 15, and the gripping fingers are closed to the appropriate gripping width to firmly grasp the vial 7 or weighing pan adapter 15. Then the robotic handler can be raised back to an appropriate height to extract the vial 7 or weighing pan adapter 15 from its seat and transport it to another location as directed by the controller terminal.

In the operation of the system, the robotic handler can be programmed to grip a vial 50 at a predetermined vial-gripping height $h_v$ and with a vial-gripping width $w_v$ and to grip for a weighing pan adapter 40 at a predetermined adapter-gripping height and/or adapter-gripping width. The different weighing pan adapters, identified by an index i=1 . . . n, are distinguished from each other by their different adapter-gripping heights $h_i$ and/or adapter-gripping widths $w_i$. Consequently, if the robotic handler 2 with the vial-handling tool 17 attempts for example to grip for a weighing pan adapter i with a higher gripping height $h_i$ and/or a wider gripping width $w_i$ than the weighing pan adapter that is actually seated in the weighing pan 9, the robotic handler 2 will fail to capture the weighing pan adapter that is seated in the weighing pan and will therefore come up empty. This distinction of different adapter-gripping heights $h_i$ and/or adapter-gripping widths $w_i$ is the basis for the method that is illustrated in FIG. 5.

Figure 5:
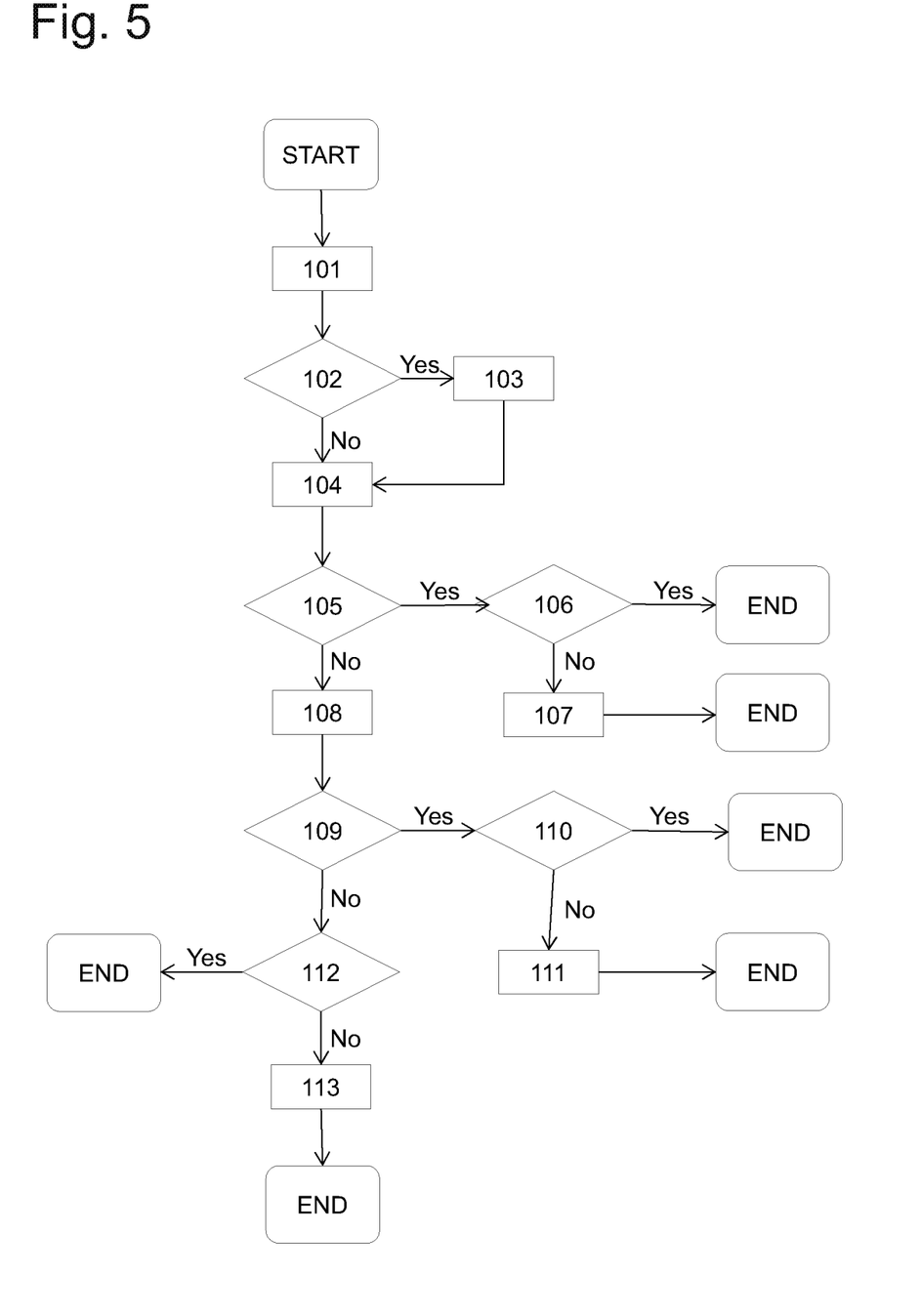
FIG. 5 represents a flowchart of the method according to the invention applied to a dosage-dispensing system with three weighing pan adapters.

The method illustrated by the flowchart diagram in FIG. 5 is performed prior to the start of every new job lot of vials in order to ascertain that the appropriate weighing pan adapter is in place in the weighing pan. In the general case of a system with n weighing pan adapters, consecutive numbers i=1 . . . n are assigned to the weighing pan adapters in order of decreasing gripping height $h_i$ and/or decreasing gripping width and the specific weighing pan adapter required for the new job lot of vials is identified by the index i=i*. In the specific example with three weighing pan adapters (n=3) which is shown in the flowchart, the weighing pan adapters are identified as large, medium and small. With the vial-handling tool coupled to the robotic handler 2, the actions (shown as rectangles) and decisions (shown as diamonds) of the method are:

Step 101: Set the balance to zero, actuate the robotic handler with the vial-handling tool to perform the motions to grip and to lift up a vial that may be seated in the weighing pan adapter on the weighing pan.

Step 102: Based on a weighing signal from the weighing module, determine whether a weight has been lifted from the balance pan and, if yes, continue at step 103, if no continue at step 104.

Step 103: remove the vial from the balance pan to a predetermined vial-dump location.

Step 104: Set the balance to zero, actuate the robotic handler with the vial-handling tool to perform the motions to grip and to lift up the large weighing pan adapter from the weighing pan.

Step 105: Based on a weighing signal from the weighing module, determine whether a weight has been lifted from the balance pan and, if yes, continue at step 106, if no continue at step 108.

Step 106: Based on the vial size specified for the upcoming job lot, determine if the large weighing pan adapter is the correct adapter for the job and, if yes, set the large weighing pan adapter back on the weighing pan and terminate the method, if no continue at step 107.

Step 107: Store large weighing pan adapter at the weighing pan adapter storage station, bring required weighing pan adapter from the storage station to the weighing pan, terminate the method.

Step 108: Set the balance to zero, actuate the robotic handler with the vial-handling tool to perform the motions to grip and to lift up the medium weighing pan adapter from the weighing pan.

Step 109: Based on a weighing signal from the weighing module, determine whether a weight has been lifted from the balance pan and, if yes, continue at step 110, if no continue at step 112.

Step 110: Based on the vial size specified for the upcoming job lot, determine if the medium weighing pan adapter is the correct adapter for the job and, if yes, set the medium weighing pan adapter back on the weighing pan and terminate the method, if no continue at step 111.

Step 111: Store medium weighing pan adapter at the weighing pan adapter storage station, bring the required weighing pan adapter from the storage station to the weighing pan, terminate the method.

Step 112: Based on the vial size specified for the upcoming job lot, determine if the small weighing pan adapter is the correct adapter for the job and, if yes, terminate the method, if no continue at step 113.

Step 113: Store small weighing pan adapter at the weighing pan adapter storage station, bring required weighing pan adapter from the storage station to the weighing pan, terminate the method.

While the invention has been described through the presentation of a specific embodiment, it is considered self-evident that numerous additional variants could be developed based on the teachings of the present invention. For example, the inventive concept could also be implemented with an articulated swivel-arm robot instead of the illustrated XYZ-system, or the vial-handling tool could be designed to approach and grasp a vial or a weighing pan adapter laterally from a side rather than from above, or the weighing pan adapters could be designed for receiving vessels other than the illustrated cylindrical vials. It should be understood that such alternative implementations of the inventive concepts fall within the bounds of protection that is hereby sought for the present invention.

What is claimed is:

1. A system for dispensing dosages of a powdery substance from a selected one of a plurality of dispensing heads into a selected one of a plurality of vials, the system comprising:
   a weighing module having a weighing pan;
   a plurality of weighing pan adapters that adapt the weighing pan to receive vials of different shapes and sizes, wherein the weighing pan adapters, relative to a working orientation thereof, have lower portions that are identical and are configured to fit the weighing pan, and upper portions that are different from each other by each weighing pan adapter having a unique combination of a predetermined vial-gripping height $h_v$ and an adapter-gripping width $w_v$ and are configured to accommodate different shapes and sizes of the vials, the plurality of weighing pan adapters consists of n weighing pan adapters that are assigned identifying numbers i=1 . . . n, wherein each weighing pan adapter i is distinguished from the other weighing pan adapters by at least one of the adapter-gripping height hi; and the adapter-gripping $w_i$;
   a robotic handler;
   a storage rack for holding a plurality of the dispensing heads;
   a second storage rack for holding a plurality of the vials;
   a unit for dispensing dosages, having a rest position and a dispensing position, the unit for dispensing dosages comprising:
      a receiver for holding and actuating a selected one of the dispensing heads;
      a tool for handling a selected one of the vials, so that, when fitted with the tool for handling a predetermined vial, the robotic handler is operative to grip the vial at a predetermined vial-gripping height $h_v$, and with a vial-gripping width $w_v$, and the robotic handler is further operative to grip each weighing pan adapter i at a predetermined adapter-gripping height $h_i$ and with an adapter-gripping $w_i$;
      a tool for handling a selected one of the dispensing heads; and
      a station for docking the tool for handling a selected one of the vials and the tool for handling a selected one of the dispensing heads; and
   a controller terminal unit, configured to:
      control mechanical manipulations of the robotic handler in picking up and transporting selected dispensing heads and selected vials;
      control the movements of the unit for dispensing dosages between the respective rest and dispensing positions; and
      receive weight signals from the weighing module;
      control the unit for dispensing dosages in actuating the selected dispensing head being held by the dispensing head receiver, in response to a received weight signal; and
   a storage station for the plurality of the weighing pan adapters;
   wherein the weighing pan adapters are configured for being picked up and transported between the weighing pan adapter storage station and the weighing pan by the robotic handler with the tool for handling a selected one of the vials.

2. The system of claim 1, wherein:
the weighing pan has the shape of a bottomless cylindrical cup such that, relative to the working orientation, a cylinder axis of the cup is oriented vertically; and
the weighing pan has an internal wall contour comprising, from the bottom upward, a first cylindrical internal wall section with a first diameter, a second cylindrical internal wall section with a second diameter larger than the first diameter, and a conically chamfered internal border section with an upward-widening diameter, ending in a flat horizontal rim at a top thereof.

3. The system of claim 2, wherein:
the lower portion of the respective weighing pan adapters is configured substantially as a hollow cylindrical tube sized and shaped for setting the weighing pan adapter into the weighing pan with the cylinder axis of the hollow tube orientated vertically.

4. The system of claim 3, wherein:
the lower portion of the respective weighing pan adapters has an outside contour with a convex-rounded bottom part, a meridian curve thereof designed to position the weighing pan adapter with a desired degree of accuracy within the first cylindrical internal wall section of the weighing pan when the weighing pan adapter is lowered and set into the weighing pan;
wherein, from the convex-rounded bottom part, the outside contour continues upward into a first cylindrical part having a first cylinder diameter dimensioned to ensure clearance between the first cylindrical part and the second cylindrical internal wall section of the weighing pan when the weighing pan adapter is lowered and set into the weighing pan;
wherein, from the first cylindrical part, the outside contour of the identical lower portion continues upward through a tapered increase in diameter to a second cylindrical part having a second cylinder diameter dimensioned to keep a narrow clearance gap between the second cylindrical part and the second cylindrical internal wall section of the weighing pan that the weighing pan adapter will return from an accidentally tilted position to the upright position; and
wherein, upward of the second cylindrical part, the outside contour of the lower portion ends in a shoulder designed to seat itself on the flat horizontal rim of the weighing pan when the weighing pan adapter is lowered and set into the weighing pan.

5. The system of claim 3, wherein the upper portion of each of the weighing pan adapters is of hollow cylindrical configuration, such that the diameter of the inside cylinder wall corresponds to the different sizes of the vials and the diameter of the outside cylinder wall may differ from the outside diameter of the lower portion of the weighing pan adapter.

6. The system of claim 5, wherein the inside cylinder wall of the upper portion of each of the weighing pan adapters is bordered at the top by a conically chamfered edge.

7. The system of claim 5, wherein each of the weighing pan adapters, inside the upper portion thereof, comprises pins which lie in a plane that extends orthogonally to the cylinder axis, protruding radially on the inside of the upper portion, the pins serving to delimit a seating depth of a vial inserted therein, such that the top of such an inserted vial protrudes sufficiently from the weighing pan adapter to allow the vial handling tool to grip the vial.

8. The system of claim 7, wherein the pins delimit the seating depths for vials of different heights, so that a top height (H) of an inserted vial, measured from the bottom of the weighing pan adapter to the top of the inserted vial is the same for all of the weighing pan adapters.

9. The system of claim 3, further comprising:
a gripping area on the outside wall contour of each of the upper portions of the weighing pan adapters, configured to allow the tool for handling a selected one of the vials to grip the weighing pan adapter.

10. The system of claim 9, wherein:
the gripping area is cylindrical and has a slightly smaller diameter than the rest of the outside wall of the upper portion, with beveled transitions from the gripping area to the adjacent wall portions above and below the gripping area.

11. A method for ascertaining the operational readiness of the dosage-dispensing system of claim 1, wherein consecutive numbers i=1 . . . n are assigned to the weighing pan adapters in order of decreasing gripping height $h_i$ and/or decreasing gripping width $w_i$, characterized in that prior to starting a job lot of vials for which a specific weighing pan adapter i* is required, the unit for dispensing dosages dosage under the command of the controller terminal executes a test routine comprising a sequence of binary yes/no decisions as follows:
a) check whether any vial is present on the weighing module and, if yes, remove said vial;
b) in sequential order of i, determine if the weighing pan adapter that is present on the weighing pan is the weighing pan adapter with the number i and, if yes, continue at step c), else increase the number i by 1 and continue at step e);
c) check whether i=i* and, if yes, end the test routine, else continue at step d);
d) remove the weighing pan adapter that is currently on the weighing pan and store it in the weighing pan adapter storage station, pick weighing pan adapter i* from the weighing pan adapter storage station and set it on the weighing pan, end the test routine; and
e) check whether i<n and, if yes, continue at step b), else continue at step c).

12. The method of claim 11, wherein the step a) of checking for the presence of a vial comprises the following substeps:
ascertaining that the robotic handler is fitted with the tool for handling a selected one of the vials;
moving the robotic handler so that the tool for handling a selected one of the vials is positioned above the weighing pan,
setting the weighing module to zero,
lowering the tool for handling a selected one of the vials tool to the vial-gripping height $h_v$,
closing the tool for handling a selected one of the vials to the vial-gripping width $w_v$,
raising the tool for handling a selected one of the vials tool, and
receiving a weighing result from the weighing module and, if said weighing result indicates that a weight was lifted from the weighing pan, conclude that a vial was present and that the binary decision result is yes.

13. The method according to claim 12, wherein the step b) of checking for the presence of weighing pan adapter i comprises the following substeps:
moving the robotic handler so that the tool for handling a selected one of the vials is positioned above the weighing pan;
set the weighing module to zero;
lowering the tool for handling a selected one of the vials to the gripping height $h_i$;
closing the tool for handling a selected one of the vials to the gripping width $w_i$;
raising the tool for handling a selected one of the vials; and
receiving a weighing result from the weighing module and, if said weighing result indicates that a weight was lifted off the weighing pan, conclude that the weighing pan adapter i was present and that the binary decision result is yes.

* * * * *